Patented Sept. 12, 1922.

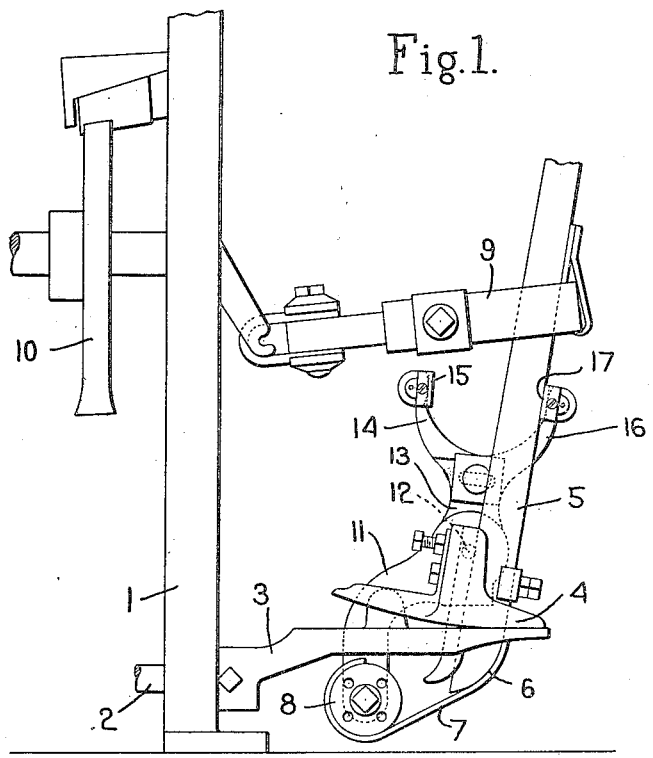
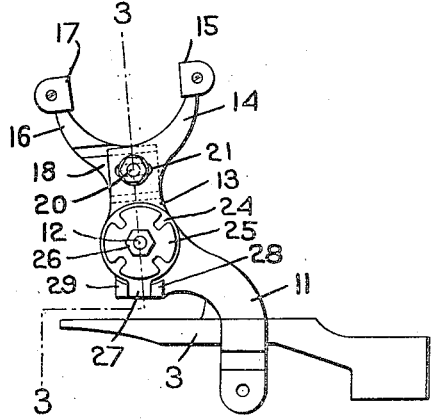
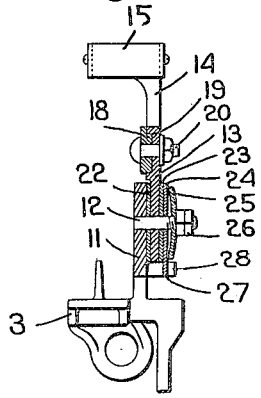

1,428,739

UNITED STATES PATENT OFFICE.

HENRY W. YOUNGQUIST, OF MANCHESTER, NEW HAMPSHIRE, ASSIGNOR TO DRAPER CORPORATION, OF HOPEDALE, MASSACHUSETTS, A CORPORATION OF MAINE.

PICKER-STICK CHECK FOR LOOMS.

Application filed June 17, 1921. Serial No. 478,233.

*To all whom it may concern:*

Be it known that I, HENRY W. YOUNG-QUIST, a citizen of the United States, and resident of Manchester, county of Hillsborough, State of New Hampshire, have invented an Improvement in Picker-Stick Checks for Looms, of which the following description, in connection with the accompanying drawing, is a specification, like characters on the drawing representing like parts.

This invention relates to improvements in picker stick checks for looms and the object thereof is to provide a picker stick check that will bring the stick to a quick and easy stop without rebound, at the end of its inner and outer movements without interfering with the effectiveness of the mechanism which actuates the picker stick.

In the usual picking mechanism of looms the picking cam is so constructed as to give the picker stick a very rapid but short acceleration on its active or picking stroke to project the shuttle across the race upon the lay of the loom. The outward or return stroke of the picker stick is usually produced by a spring which acts upon the lower end of the picker stick and returns the picker stick nearly to its original position, the remaining outer movement of the picker stick being caused by the impact of the returning shuttle which is thrown across the loom by the picker stick upon the opposite end of the loom. In order gradually to arrest the shuttle and to prevent a rebound of the shuttle the checking means also acts gradually to bring the picker stick to rest at the end of its outward stroke.

In usual constructions the picker stick has been carried by the lay and the weight of the picker check mechanism, which is thus sustained by the lay at so great a distance from the axis about which the lay swings, adds considerable momentum to the lay.

The present invention contemplates the provision of a picker stick checking mechanism which is carried by the rocker stand and consequently is relatively close to the axis about which the lay oscillates, thereby producing less additional momentum to the lay than is produced by usual types of picker checks.

One of the principal objects of the invention is to provide a picker check thus carried by the rocker stand which will engage the picker stick a short distance in advance of the limits of its inward and outward movements respectively and bring the picker stick gradually to rest at the limit of such movements without imposing any resistance upon the means for actuating the picker stick.

A further object of the invention is to provide a picker stick check of this character which may be adjusted to enable the proper amplitude of free movement to be given to the picker stick.

A further object of the invention is to provide a picker stick check of this character in which the braking action of the picker check may be readily and accurately adjusted.

Other objects and features of the invention will more fully appear from the following description and the annexed drawings and will be pointed out in the accompanying claims.

The present invention is illustrated as applied to a loom of the well known "Northrop" type and, therefore only so much of the loom is illustrated as is necessary to show the application of the invention thereto.

In the drawings:

Fig. 1 is a front elevation of a sufficient portion of the loom side and picker stick mechanism to show the application of my invention thereto;

Fig. 2 is a detail rear elevation of the picker check carried by the rocker stand; and, Fig. 3 is a vertical sectional view on line 3—3, Fig. 2.

The invention may be applied to any usual type of loom comprising loom sides 1 which carry the usual lay rocker shaft 2 having secured at its ends rocker stands 3 which support the rocker shoes 4 to which the picker sticks 5 are secured. The lower end of the picker stick is provided with a curved portion 6 which is connected by the usual strap 7 to the spring drum 8 which serves to move the picker stick outwardly. The picker stick may be and is actuated through the lug strap 9 which is operated through the usual pick motion by the cam 10.

The present invention comprises a picker check which is carried by or mounted upon the rocker stand 3 and is provided with means adapted to be engaged by the picker stick when aproaching the limit of its movement in either the inward or outward direction and act to quickly and easily bring the picker stick to rest at the ends of such movement.

In the particular embodiment of the invention disclosed herein the rocker stand 3 is provided with an upwardly extending arm 11 which is provided with a laterally extending stud 12 upon which the picker check is pivotally mounted. The picker check in the form illustrated herein comprises a plate 13 which is pivotally mounted at its lower end upon the stud 12 and is provided at its upper end with a laterally extending arm 14 having at its end a picker stick engaging member 15 which extends into the path of the picker stick. The picker check also is provided with another arm 16 which preferably is symmetrical with the arm 14 and likewise is provided with a picker stick engaging member 17 which extends into the path of the picker stick. The lower end of the arm 16 desirably is provided with a rectangular boss 18 which is slidably mounted in a suitable way 19 in the plate 13. The arm 16 preferably is connected to the plate 13 by a bolt 20 which passes through said plate and the boss 18 upon the arm 16 and clamps the same rigidly together. Desirably the boss 18, or the plate 13, is provided with a slot 21 adapted to permit an adjustment of the arm 16 relatively to the arm 14, so that the distance between the picker stick engaging members 15 and 17 may be adjusted in accordance with the desired amplitude of oscillation of the picker stick.

The distance between the picker stick engaging members 15 and 17 is shorter than the length of the arc of movement of the picker stick at points at which the picker stick engages the members 15 and 17; consequently, the movement of the picker stick upon engaging first one and then the other of the members 15 and 17 will cause an oscillation of the picker check about the pivotal stud 12.

Any suitable means may be provided for producing a braking action upon the picker check. A convenient means which is illustrated herein comprises a washer 22 of frictional material which is interposed between the plate 13 and the face of the standard 11, and a frictional washer 23 which is interposed between the opposite face of the plate 13 and a disk 24 which is engaged by a spring washer 25 upon which tension is imposed by a nut or nuts 26 upon the stud 12. The disk 24 desirably is provided with an extension 27 which is engaged by lugs 28 and 29 extending outwardly from the standard 11 so that rotation of the disk 24 is prevented. By adjusting the nut 26 to increase or decrease the tension of the spring washer 25 the frictional resistance to the oscillation of the plate 13 about its pivot may be varied easily and accurately so that a proper braking action may be imposed upon the picker check.

While the picker check is illustrated herein as mounted for oscillation about a fixed pivot it will be understood that the same may be otherwise mounted in such a manner to be reciprocated by the action of the picker stick and that suitable braking mechanism may be provided for controlling the movement of the picker check.

In the operation of the loom the picker stick is oscillated by the pick motion through the lug strap 9 from its outer position, which is illustrated in Fig. 1, toward the loom side to pick the shuttle across the loom. As the picker stick is thus actuated the rocker at its lower end rocks upon the rocker stand 3 and the upper end of the picker stick is given a short accelerating motion which results in throwing the shuttle across the loom. The action of the lug strap upon the picker stick, however, ceases after it has passed a short distance beyond the upper center of its stroke. Before the picker stick reaches the limit of its throw it engages the picker check member 15, thus causing the oscillation of the picker check about the pivotal stud 12. The frictional resistance or braking action which is imposed upon the pivotal movement of the picker check brings the picker stick quickly and easily to rest. The movement of the arm 14 causes a movement in the same direction of the arm 16 which carries the picker stick engaging member 17. When, therefore, the upper end of the picker stick is caused to be moved outwardly by the action of the spring drum 8 and strap 6, the picker stick engages the member 17 of the arm 16 before it reaches the limit of its outward movement. The returning shuttle, upon engagement with the picker stick, forces the picker stick to the limit of its outward movement. This movement, however, is subject to the braking action of the picker check which is caused to oscillate in the outward direction about the pivot 12, under the control of the frictional mechanism above described.

It will be observed that the initial movement of the picker stick, under the action of the pick mechanism, is unrestricted and that the picker check only acts upon the picker stick as the latter approaches the limit of its movement in its picking stroke and also that the picker check acts on the reverse or outward movement only after the picker stick has approached closer to its outer movement and is engaged by the returning shuttle. Thus means are provided for easily and gently arresting the picker stick which eliminates the shock which would be produced by the sudden arrest of the picker stick and also provides means for gradually bringing the picker stick to a stop at the limit of its outer movement which will prevent rebound of the shuttle.

Desirably the pivotal axis upon which the picker check is mounted is located at or approximately in the line of the axis of oscillation of the picker stick and the members 15 and 17 which engage the picker stick desirably are located as nearly as may be to the line in which the center of oscillation of the picker stick moves, so that no substantial vibration will be imparted to the picker stick upon engagement with the members 15 or 17.

It will be understood that the embodiment of the invention disclosed herein is of an illustrative character and that various other constructions may be provided within the spirit and scope of the invention.

Having thus described my invention, what I claim as new, and desire to secure by Letters Patent, is:

1. In a picker stick mechanism comprising a picker stick having a rocker shoe, a rocker shoe stand and means for actuating said picker stick, a picker stick check comprising a rigid arm, pivotally mounted on said rocker stand, having a member positioned in the path of said picker stick to engage one side thereof, a complementary arm adjustably mounted on said pivoted arm at a distance above its pivot and having a member positioned to engage the opposite side of said picker stick, said arms being so positioned as to engage the picker stick in advance of the limits of its inward and outward movements and frictional means for braking the movement of said picker stick check operable gradually to arrest the picker stick.

2. In a picker stick mechanism comprising a picker stick having a rocker shoe, a rocker shoe stand and means for actuating said picker stick, a picker stick check comprising an arm pivotally mounted on said rocker stand, having a member positioned in the path of said picker stick to engage one side thereof and a guideway located at a distance above its pivot, a complementary arm having a member to engage the opposite side of the picker stick and provided at its lower end with a boss slidably mounted in the guideway in the pivot arm, a bolt and slot connection between said boss and said arm and frictional means for braking the pivotal movement of said picker stick check operable gradually to arrest the picker stick.

In testimony whereof, I have signed my name to this specification.

HENRY W. YOUNGQUIST.